(12) United States Patent
Arora et al.

(10) Patent No.: US 8,659,278 B2
(45) Date of Patent: Feb. 25, 2014

(54) CONTROLLER FOR SWITCHING REGULATOR, SWITCHING REGULATOR AND LIGHT SOURCE

(75) Inventors: Rohit Arora, Salford (GB); Alan James Dodd, Bolton (GB); Craig Maurice Taylor, Oldham (GB)

(73) Assignee: Diodes Zetex Semiconductors Limited, Oldham (GB)

( * ) Notice: Subject to any disclaimer, the term of this patent is extended or adjusted under 35 U.S.C. 154(b) by 470 days.

(21) Appl. No.: 12/729,006

(22) Filed: Mar. 22, 2010

(65) Prior Publication Data

US 2010/0244801 A1    Sep. 30, 2010

(30) Foreign Application Priority Data

Mar. 27, 2009  (EP) ..................... 09250915

(51) Int. Cl.
*G05F 1/575* (2006.01)
(52) U.S. Cl.
USPC .......................................... 323/284; 323/285
(58) Field of Classification Search
USPC .......................................... 323/284, 285–286
See application file for complete search history.

(56) References Cited

U.S. PATENT DOCUMENTS

| | | | |
|---|---|---|---|
| 6,064,187 A | 5/2000 | Redl et al. | |
| 6,424,129 B1 | 7/2002 | Lethellier | |
| 6,894,471 B2 * | 5/2005 | Corva et al. | 323/282 |
| 7,436,129 B2 * | 10/2008 | Olson | 315/291 |
| 7,492,132 B2 * | 2/2009 | Kuroiwa et al. | 323/222 |
| 2003/0142519 A1 | 7/2003 | Walters et al. | |
| 2005/0017703 A1 | 1/2005 | Walters et al. | |
| 2008/0068866 A1 * | 3/2008 | Blanken | 363/21.01 |
| 2009/0015178 A1 | 1/2009 | Liu | |
| 2009/0080227 A1 * | 3/2009 | Nakahashi | 363/80 |

FOREIGN PATENT DOCUMENTS

| | | |
|---|---|---|
| GB | 2462204 A | 3/2010 |
| WO | 2005100614 A1 | 10/2005 |

OTHER PUBLICATIONS

Extended European Search Report for application No. EP 09 25 0915.7 dated Sep. 8, 2009, 6 pages.

* cited by examiner

*Primary Examiner* — Harry Behm

(57) ABSTRACT

A switching regulator (2-5) supplies a controllable stable average current to a load (1), such as series-connected light emitting diodes. A regulator controller (2) includes a hysteretic comparator (12, 30) which controls a switch in the form of a transistor (15) for switching current into an inductor (3). The comparator (12) has upper and lower thresholds. A first circuit comprising a fast current monitor (6) supplies a first signal to the comparator representing the instantaneous current in the inductor (3). A second circuit (36, 37, 41, and 42) supplies a second signal to the comparator representing an error between a desired regulator output and an actual regulator output.

14 Claims, 14 Drawing Sheets

CONTROLLER FOR SWITCHING REGULATOR, SWITCHING REGULATOR AND LIGHT SOURCE

RELATED APPLICATIONS

This application claims priority to European Patent Application No. 09250915.7, filed on Mar. 27, 2009.

SUMMARY OF THE INVENTION

The present invention relates to a controller for a switching regulator. The present invention also relates to a switching regulator including such a controller and to a light source including such a switching regulator.

FIG. 1 of the accompanying drawings shows a known type of switching regulator for supplying a controlled desired current through a load 1. The regulator is of the hysteretic self-oscillating buck converter type and a typical application of such a regulator is for supplying a controlled desired current through the load, which may comprise a plurality of series-connected light emitting diodes (LEDs).

The regulator comprises a controller 2 embodied as a monolithic integrated circuit and provided with an external inductor 3, a diode 4 and a current-sensing resistor 5. The controller 2 comprises a current monitor 6 having inputs connected to input terminals 7 and 8, which are connected across the resistor 5. The current monitor 6 is in the form of a voltage-to-current converter or transconductance amplifier for converting the voltage between its inputs to a corresponding current, which passes through a resistor 9 to a ground terminal 10 of the controller 2 connected to ground 11. The resulting voltage developed across the resistor 9 is supplied to the inverting input of a hysteretic comparator 12.

The non-inverting input of the comparator 12 is connected to a terminal 13 for receiving a voltage for setting a desired controlled current through the load 1. The output of the comparator 12 is connected to the input of a gate driver 14, whose output is connected to the gate of a field effect transistor 15 (or alternatively to the base of a bipolar transistor) acting as an electronic switch. The gate driver 14 provides an interface between the comparator 12 and the transistor 15, for example to supply a drive signal of the appropriate level and power for controlling the transistor 15. The source of the transistor 15 is connected to the terminal 10 whereas the drain is connected to a terminal 16.

The terminal 16 is connected to one terminal of the inductor 3 and to the anode of the diode 4, whose cathode is connected to a terminal 17 for receiving a power supply input from a power supply source. The load 1 and the resistor 5 are connected in series between the terminal 17 and the second terminal of the inductor 3.

Operation of the regulator is illustrated by the waveform diagrams in FIG. 2 of the accompanying drawings. The upper diagram illustrates the switching state of the transistor 15, the middle diagram illustrates the sense voltage developed across the sensing resistor 5, and the lower diagram illustrates the current through the load 1. When power is supplied to the terminal 17, there is initially no current passing through the load 1, the inductor 3 and the resistor 5. The inverting input of the comparator 12 is therefore below the voltage at the terminal 13 so that the output of the comparator 12 is high. This switches on the transistor 15 via the gate driver 14 so that the resistor 5, the load 1 and the inductor 3 are connected in series across the output of the power supply source. Current therefore increases through the resistor 5, the load 1 and the inductor 3 and the voltage across the resistor 5 increases. The voltage across the resistor 9 therefore increases.

The comparator 12 is of the hysteretic type having upper and lower switching thresholds. In a typical application, the hysteresis is set to correspond to 30% of the average desired output current. When the voltage at the inverting input of the comparator 12 rises to 15% above the voltage at the terminal 13, the output of the comparator 12 falls and switches off the transistor 15. The magnetic field which has been stored in the inductor 3 begins to collapse and to drive a back-electromotive force (EMF) so that current continues to flow through the resistor 5 and the load 1 via the diode 4. This current falls until the resulting voltage at the inverting input of the comparator 12 falls below the lower threshold. At this point, the output of the comparator rises and switches on the transistor 15. The current therefore flows from the power source through the resistor 5, the load 1 and the inductor 3 until the upper threshold of the comparator 12 is reached again. The regulator therefore self-oscillates and generates a sawtooth load current having a peak higher value IthH and a peak lower value IthL as shown in the lower diagram in FIG. 2.

Open loop control is provided by a first circuit including the current monitor 6. The actual output current supplied to the load 1 is dependent on the comparator switching thresholds, which are typically set by a reference voltage, and on circuit offsets and gain errors, temperature and supply voltage variations and propagation delays through the controller from the input terminals 7 and 8 to the output terminal 16. For example, any DC offsets measured at the current monitor inputs, resulting from offsets in the current monitor 6, the setting of the switching thresholds, or the comparator will cause the average load current to deviate from the nominal desired current. A high level of DC precision is necessary in the current monitor 6 and in the comparator 12 to reduce these errors. However, as described hereinafter, the current monitor 6 and the comparator 12 need to be "fast" and this conflicts with the requirements of DC accuracy.

FIG. 2 illustrates operation of the regulator of the FIG. 1 in the ideal case where there are no switching delays, DC offsets and the like to comprise performance. However, in practice, these various error mechanisms exist to varying degrees. FIG. 3 of the accompanying drawings illustrates the actual operation taking into account propagation delays from the input terminals 7 and 8 of the controller to the output terminal 16. In particular, as the current through the sensing resistor 5 ramps towards the upper and lower peak values, the current will reach a value corresponding to the relevant comparator switching threshold or "theoretical hysteresis" as shown in the middle diagram of FIG. 3. However, there will be a delay between reaching the theoretical hysteresis switching threshold and switching of the state of the transistor 15, which results in an "actual hysteresis" as shown in FIG. 3. The propagation delays are illustrated as tpdH and tpdL in the lower diagram of FIG. 3 together with the resulting higher and lower peak current values Iout max and Iout min.

FIG. 4 of the accompanying drawings illustrates what happens when current through the resistor 5, the load 1 and the inductor 3 is rising at two different rates, for example corresponding to the application of two different power source voltages. Similar issues arise for a constant power source voltage and different load voltages or for different power source voltages and different load voltages but, for simplicity and without loss of generality, detailed analysis will be limited to different power source voltages and a constant load.

The sense voltage across the resistor 5 is illustrated for a lower supply voltage 20 and for a higher supply voltage 21. The theoretical sensor threshold is shown by the broken line 22 and the waveforms have been synchronised so as to cross the theoretical threshold at the same time at the point A.

Because of the propagation delay through the controller, the state of the transistor 15 remains unchanged at the point A and does not change until a time corresponding to the waveform points C and E. Thus, the actual or effective switching threshold for the lower supply voltage represented by the waveform 20 is as shown at 23 whereas that for the higher voltage supply waveform 21 is higher and is shown at 24.

For either case, the rate of change of current passing through the load 1 when the transistor 15 has switched off will be the same so that the voltage across the resistor 5 will fall at the same rate as shown by the portions 20' and 21' of the waveforms 20 and 21. These waveforms will therefore cross the theoretical sense threshold 22 at different times represented by B and D in FIG. 4. The propagation delay through the regulator therefore gives rise to different error terms for different supply voltages, with the error terms in FIG. 4 being represented by the areas of the triangles ABC and ADE. Positive overshoot adds an error term to the average current through the load causing it to be higher than desired.

FIG. 5 illustrates the sense voltage as it falls, corresponding to the transistor 15 being switched off. As the sense voltage falls below the lower theoretical sense threshold 25, the propagation delay allows the sense voltage to continue falling until it reaches the point H. The falling sense voltage is shown by a single waveform 26 as the rate of change of the sense voltage is determined by the current passing through the load and is independent of the supply voltage. However, when the transistor 15 turns on at the end of the propagation delay, the current through the load and hence the sense voltage will rise at a rate dependent on the power source voltage supplied to the regulator. The resulting waveforms 20 and 21 correspond to the different supply voltages of the waveforms 20 and 21, respectively, shown in FIG. 4. This results in two more error terms proportional to the areas of the triangles FGH and FJH. Negative overshoot subtracts an error term from the average current, causing it to be lower than the desired value.

The positive and negative "overshoot" error terms may cancel each other if the duty cycle of the regulator is around 50% and the propagation delays are similar when crossing both switching thresholds. However, during normal operation there will typically be some asymmetry with the result that the actual average load current will be different from the desired value. This is particularly evident at extremes of duty cycle when the switching frequency is high, in which case the transistor 15 is on or off for a relatively short time and the propagation delay becomes significant compared with the pulse width.

As shown in FIGS. 4 and 5, the areas of the triangles ADE and FJH are similar so that, for the higher power supply voltage corresponding to the waveform 21, the average load current will be close to the desired load current. However, the areas of the triangles ABC and FGH are substantially different so that, for the supply voltage corresponding to the waveform 20, the average output current will be lower than the desired value.

The frequency at which the regulator operates is determined largely by the inductance L of the inductor 3 and the output current ripple determined by the comparator hysteresis. Although the regulator may operate over a relatively wide range, it is undesirable for the frequency to be excessively high because the switching losses may become significant and unacceptable. If the switching frequency becomes too low, this may cause audible noise from the inductor and may compromise electro-magnetic compatibility (EMC).

The regulator may be controlled by varying the voltage at the input terminal 13, for example so as to permit dimming of the LEDs when used as the load 1. As the voltage at the input 13 is reduced, the output current and the ripple current both decrease but the switching frequency increases. Electrical efficiency may therefore be impaired for dimmed output currents.

According to a first aspect of the invention, there is provided a controller for a switching regulator, comprising: a hysteretic comparator for controlling a switch for switching current into an inductor, the comparator having upper and lower thresholds; a first circuit for supplying a signal, representing instantaneous current in the inductor, to the comparator; and a second circuit for supplying a second signal to the comparator, representing an error between a desired regulator output and an actual regulator output.

For instance, the second signal may be an averaged signal applied as a negative feedback signal modifying an input voltage to the comparator whereby an averaged inductor current is controlled. By the term "averaged" in this specification is meant the mean value averaged over a number of switching cycles, for instance at least 3 switching cycles, preferably at least 5, more preferably at least 10.

The second signal may be applied as negative feedback in the form of a current which modifies a voltage across a resistor at the input to the comparator.

In other words, the first aspect of the invention may provide a controller for a switching regulator, comprising: a hysteretic comparator for controlling a switch for switching current into an inductor, the comparator having upper and lower thresholds; a first circuit for supplying a signal, representing instantaneous current in the inductor, to the comparator; and a second circuit for supplying a second signal, representing an error between a desired regulator output and an actual regulator output, wherein the second signal may be an averaged signal applied as a negative feedback signal modifying an input voltage to the comparator.

The second signal may be applied as negative feedback in the form of a current which modifies a voltage across a resistor at the input to the comparator.

The controller may be a controller for a switching current regulator.

The second circuit may have a slower response time than the first circuit. The second circuit may include an integrator. The integrator may be arranged to integrate the difference between the desired regulator output and the actual regulator output. The integrator may have a time constant of the order of several switching cycle periods during operation of the regulator, for instance at least 3 switching cycle periods, preferably at least 5, more preferably at least 10.

The first and second circuits may have first and second inputs, respectively, which are connectable or connected together and the second circuit may include a gate arranged to pass a signal from the second input when the switch is off and to block the signal from the second input when the switch is on. The gate may be arranged to be controlled by the comparator.

The comparator may be arranged to provide a percentage of hysteresis which is a function of the desired regulator output. The percentage of hysteresis may be proportional to the desired regulator output. The percentage of hysteresis may be proportional to the sum of a first term proportional to the desired regulator output and a second constant term.

The comparator may be arranged to provide a percentage of hysteresis which is a function of the switching frequency of the regulator when in operation. The percentage of hysteresis may be proportional to the switching frequency.

The comparator may have a first input arranged to receive the first and second signals and a second input for receiving an adjusting signal from a first adjusting input for setting the desired regulator output. The second circuit may have an input for receiving the desired regulator output connected to the first adjusting input. The second circuit may have an input for receiving the desired regulator output connected to a second adjusting input. The first adjusting input may be connected to the input of a potential divider whose output is connected to the second adjusting input. The second circuit may comprise a further comparator having first and second inputs connected to the first and second adjusting inputs and an output for controlling enabling or bypassing of the gate.

The controller may include the switch.

The switch may comprise a transistor.

According to a second aspect of the invention, there is provided a switching regulator comprising a controller according to the first aspect of the invention and an inductor.

The regulator may comprise a first sensing resistor in series with the inductor and connected to the first circuit. The first sensing resistor may be connected to the second circuit.

The regulator may comprise a second sensing resistor in series with an output of the regulator and connected to the second circuit.

An output, or the output, of the regulator may be connected to the inductor via a diode.

According to a third aspect of the invention, there is provided a light source comprising at least one light emitting device connected to a regulator according to the second aspect of the invention.

It is thus possible to provide a controller and a regulator of improved performance, in particular with respect to the stability of the output current. For example, the effects of propagation delay and overshoot may be substantially reduced so that variation of, for example, desired output current with variation in input supply voltage may be reduced. Also, the effects of offsets and drifting with temperature and/or time may be reduced. In some embodiments, variations in switching frequency may be reduced. It is also possible to provide embodiments which may operate in buck mode, boost mode or buck-boost mode, for example using a common controller for all such modes. The invention provides the benefit of using a single sensing element to provide control, giving potential for reduction in errors, cost and size. The combination of a single sensing element combined with two parallel processing stages may provide rapid operation and improved control compared to the prior art.

The invention will be further described, by way of example, with reference to the accompanying drawings, in which:

DETAILED DESCRIPTION

Figure 1:
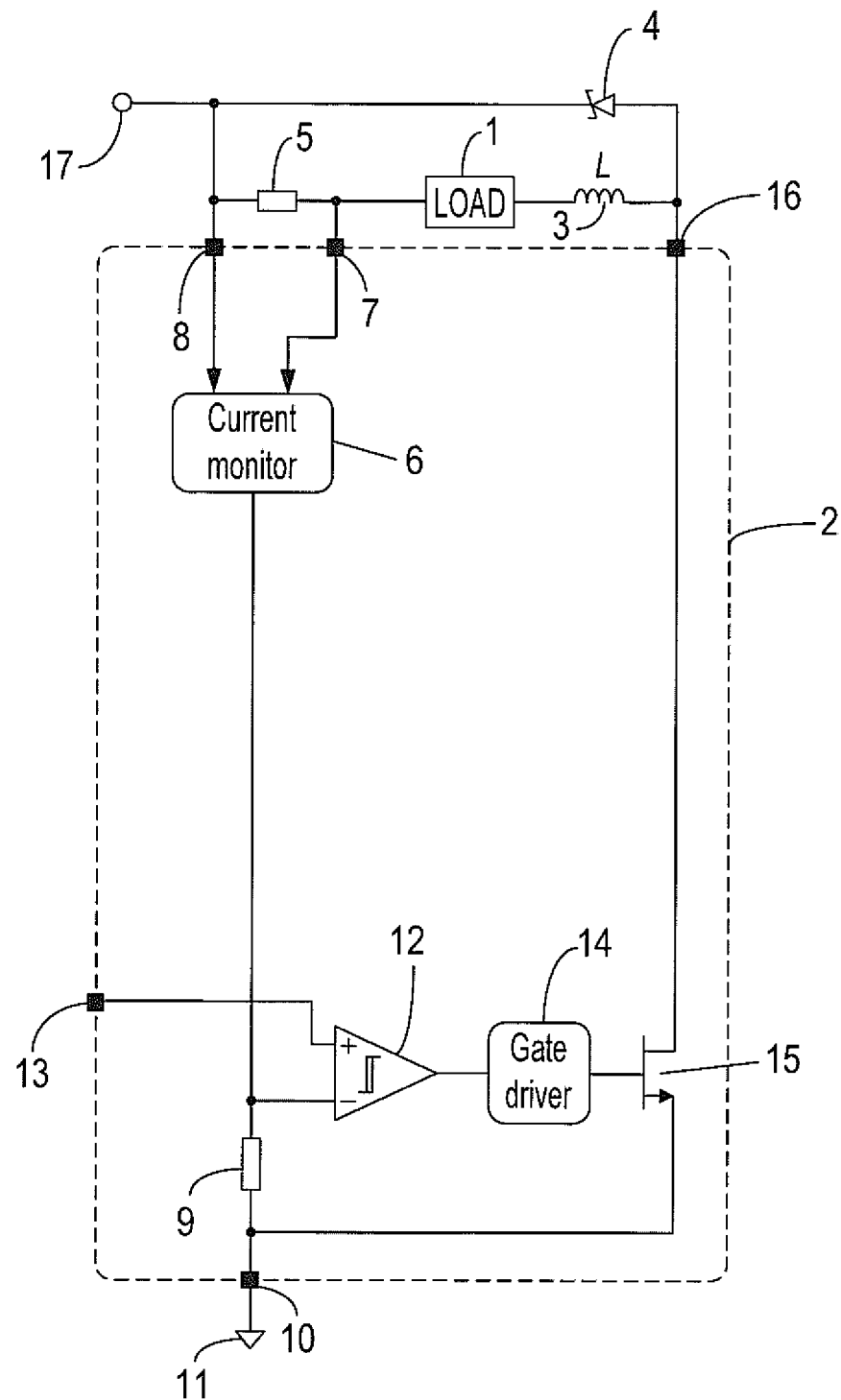
FIG. 1 is a block schematic diagram of a known type of regulator.
Figure 2:
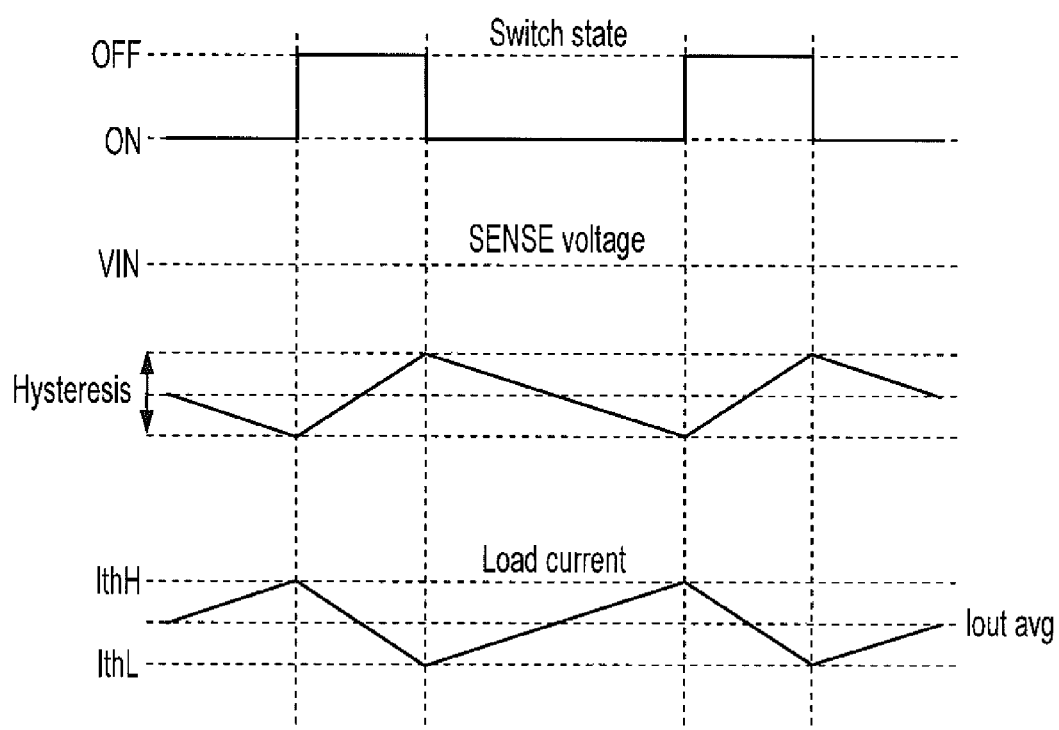
FIG. 2 is a waveform diagram illustrating waveforms occurring in an ideal regulator of the type shown in FIG. 1.
Figure 3:
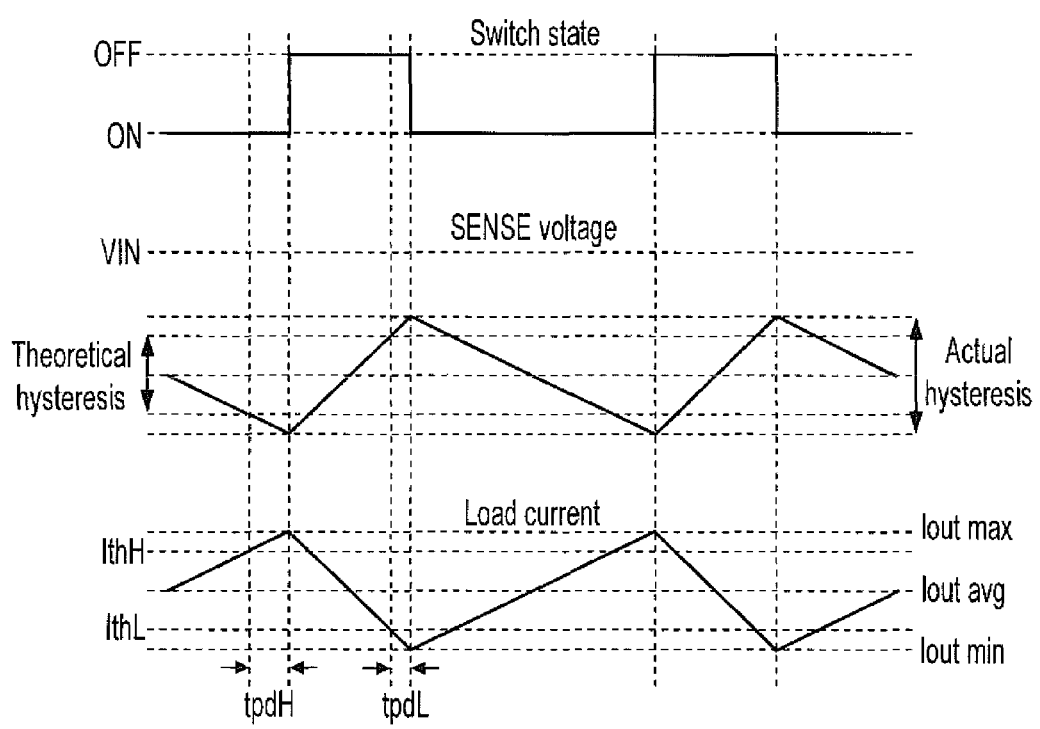
FIG. 3 is a waveform diagram illustrating waveforms occurring during use of a practical regulator of the type shown in FIG. 1.
Figure 4:
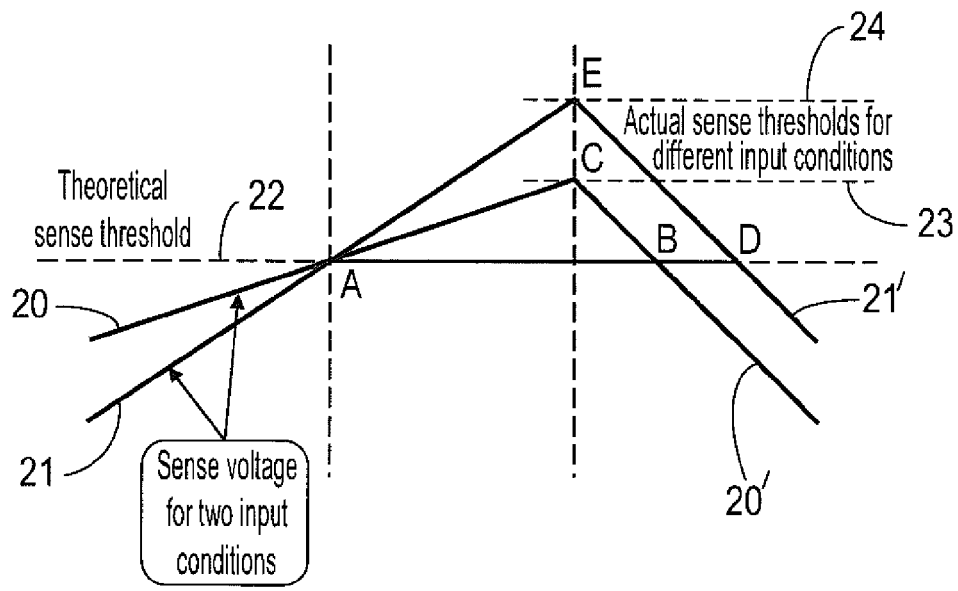
FIGS. 4 and 5 are detailed waveform diagrams illustrating overshoot and undershoot during operation as illustrated in FIG. 3.
Figure 5:
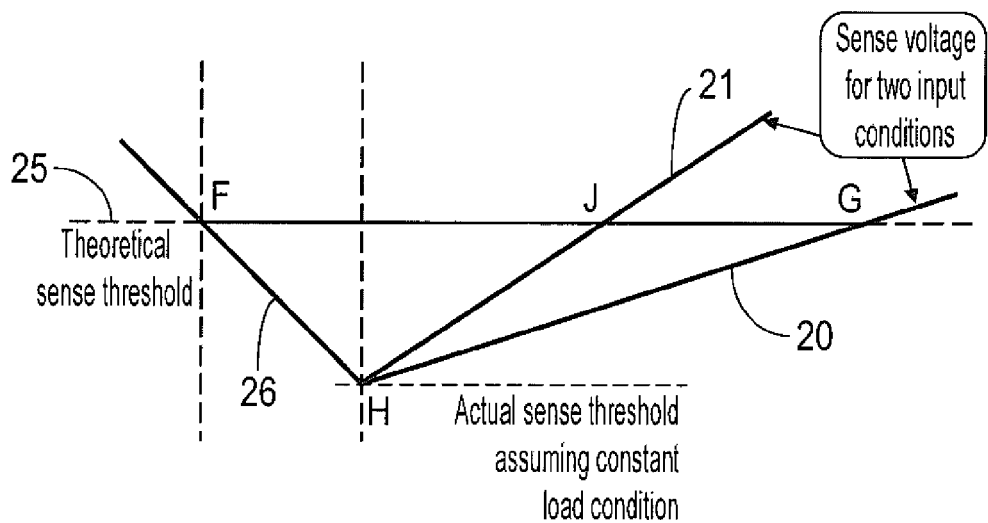

Like reference numerals refer to like parts throughout the drawings and those parts and aspects of operation which have been described hereinbefore will not be described again in detail.

Figure 6:
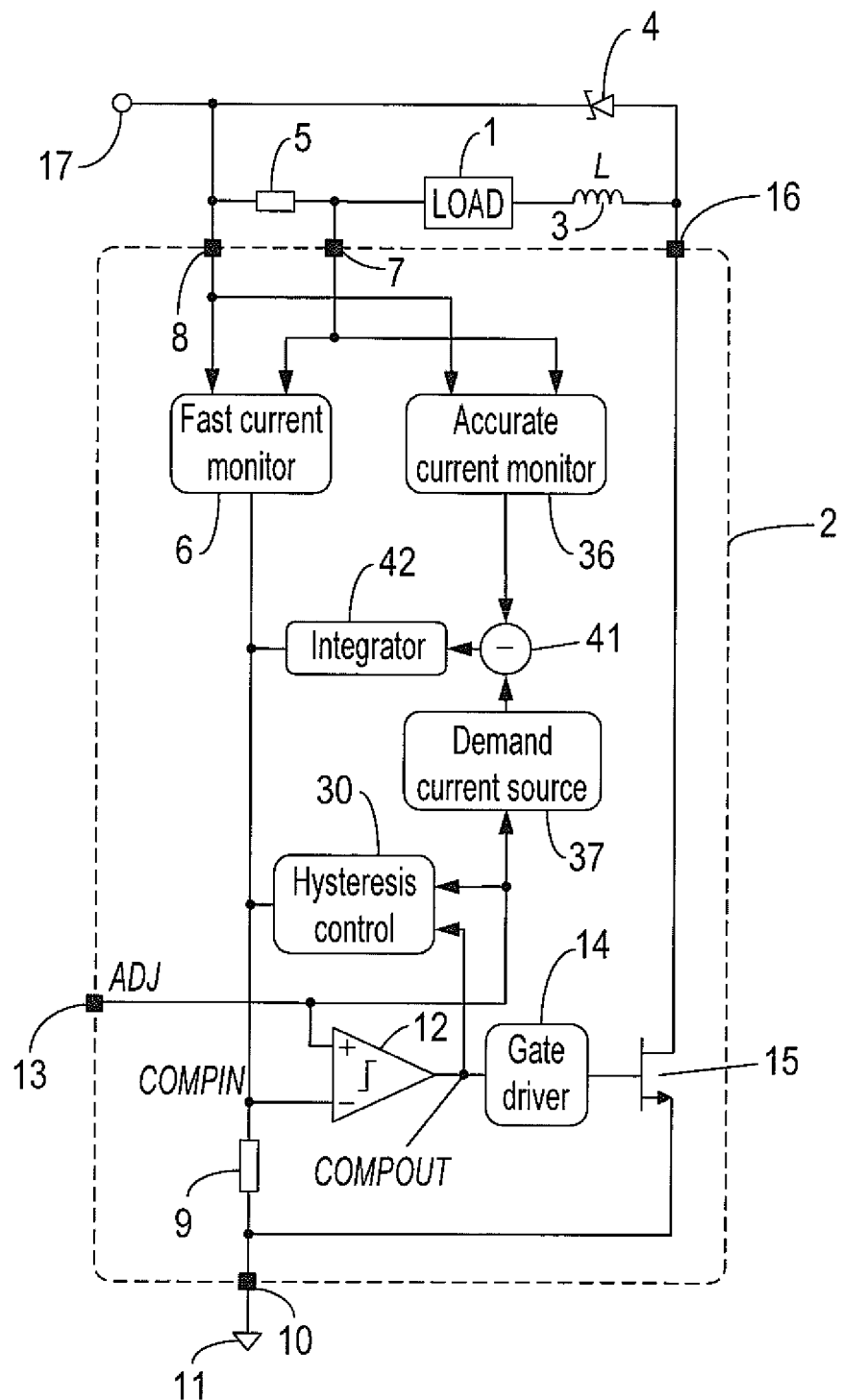
FIG. 6 is a block schematic diagram of a switching current regulator and controller constituting a first embodiment of the invention.

The controller and regulator shown in FIG. 6 are of the same general type as shown in FIG. 1. In particular, the elements 1 to 17 in FIG. 6 are the same as the corresponding elements in FIG. 1 and will not be described further. Also, the basic operation is the same as described for FIG. 1 in that the regulator is of the "buck" type and self-oscillates so as to control the current through the load 1 in accordance with the comparator hysteresis, the inductance L of the inductor 3 and the voltage supplied to the "adjust" (ADJ) input 13.

Figure 7:
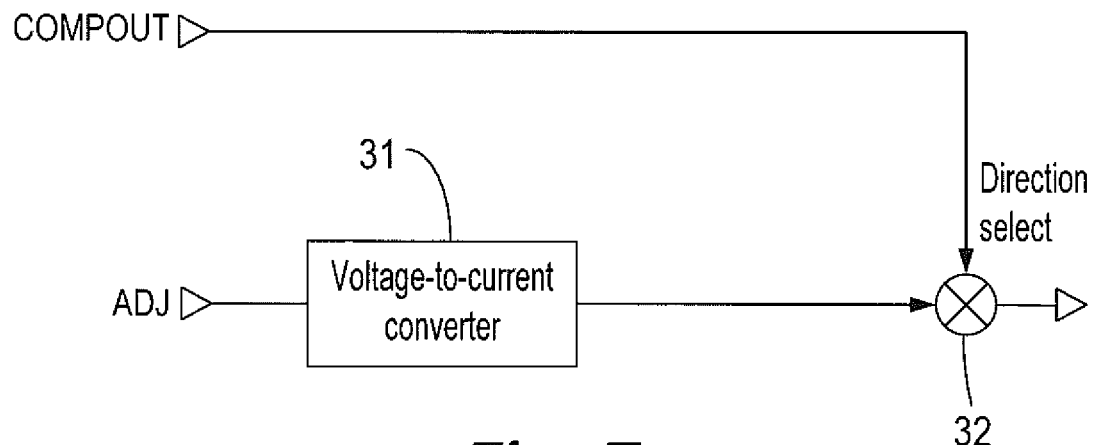
FIG. 7 illustrates an example of a hysteresis control of the regulator of FIG. 6.

In FIG. 6, the hysteresis control 30 is shown separately from the comparator 12 and is illustrated in FIG. 7. The adjust voltage $V_{ADJ}$ is supplied to a voltage-to-current converter 31, for example in the form of a transconductance amplifier, which supplies an output current $I_{out}$ equal to $K_1 \ast V_{ADJ}$, where $K_1$ is a constant and represents the transconductance of the converter 31. The output current is supplied to a polarity selecting circuit 32 which either supplies the output current from the converter 31 without further processing or inverts the polarity of the current in accordance with a direction select signal. The output COMPOUT of the comparator 12 is used as the direction select signal and the output of the circuit 32 is combined with the output of the current monitor 6 supplied to the resistor 9 and to the inverting input of the comparator 12.

Figure 8:
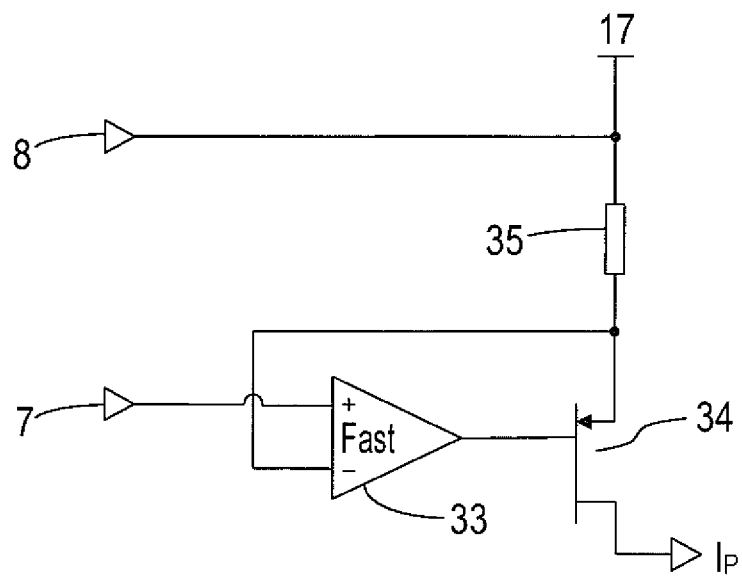
FIG. 8 illustrates an example of a current monitor of the regulator of FIG. 6.

The current monitor 6 of the controller 2 shown in FIG. 6 is a "fast" current monitor, which is optimised for speed of response or low propagation delay at the expense of other parameters, such as DC offsets and the like. For example, the current monitor 6 comprises a current sourcing transconductance amplifier arrangement as shown in FIG. 8. The monitor comprises a fast operational amplifier 33 whose output is connected to the gate of a field effect transistor 34 (or the base of a bipolar junction transistor). The non-inverting input of the operational amplifier 33 is connected to the input terminal 7. The source of the transistor 34 is connected to the inverting input of the operational amplifier 33 and via a resistor 35 to the input terminal 8 and to the power source input 17. The drain of the transistor 34 forms the output of the fast current monitor such that the output current sourced by the monitor is equal to the voltage drop across the resistor 5 multiplied by the (fixed) transconductance (or mutual conductance) of the monitor.

The input terminals 7 and 8 are connected to another "accurate" current monitor 36, which also converts the voltage drop across the sensing resistor 5 to an output current. The current monitor 36 may have the same general circuit configuration as shown in FIG. 8 but with the operational amplifier optimised for accuracy, having a lower bandwidth and having internal frequency compensation. The slew rate of the amplifier 36 is lower than that of the fast current monitor 6 but errors and tolerances such as current and voltage offsets are much lower so that the output current of the monitor 36 provides a better representation of the current through the resistor 5, and hence through the load 1 and the inductor 3.

Figure 9:
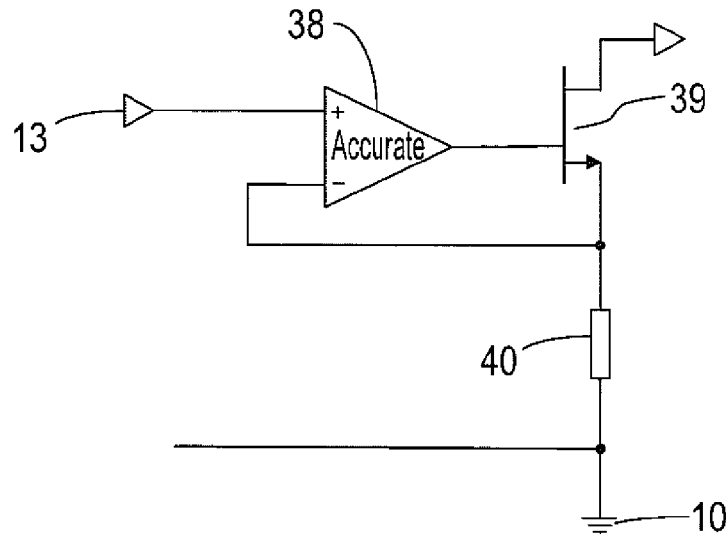
FIG. 9 illustrates an example of a demand current source of the regulator of FIG. 6.

The input 13 is also connected to a demand current source 37 and is arranged to convert the adjustment voltage $V_{ADJ}$ to a corresponding current. The demand current source 37 may also be in the form of a transconductance amplifier and a suitable arrangement is illustrated in FIG. 9. The source 37 comprises an "accurate" operational amplifier 38, for example similar to that provided in the current monitor 36. The non-inverting input of the operational amplifier 38 is connected to the input 13. The output of the amplifier 38 is connected to the gate of a field effect transistor 39 whose drain forms the current-sinking output of the demand control source 37 and whose source is connected to the inverting input of the amplifier 38 and to a first terminal of a resistor 40, whose second terminal is connected to the ground terminal 10.

The outputs of the current monitor 36 and the current source 37 are connected to a differencing circuit node 41, whose output is connected to the input of an integrator 42. For example, the integrator 42 may comprise an operational amplifier with an integrating capacitor connected between its output and inverting input, in which case the node 41 may be formed by the inverting input of the operational amplifier. The output of the integrator 42 supplies a current, which is the integral with respect of time of the difference between the outputs of the current monitor 36 and the current source 37. The output current of the integrator 42 is combined with the output currents of the current monitor 6 and the hysteresis control 30 to provide the input signal COMPIN to the inverting input of the comparator 12, in the form of the voltage developed across the resistor 9.

The current monitor 36, the current source 37, the circuit node 41, and the integrator 42 form a second circuit which supplies a second signal to the comparator 12 in the form of a negative feedback signal for varying the first signal supplied by the current monitor 6 with respect to the switching thresholds of the comparator 12 as defined by the hysteresis control 30. The integrator 42 has a time constant which is of the order of a plurality of cycles at the switching frequency of the regulator. The second signal supplied by the integrator 42 thus varies much more slowly than the first signal supplied by the current monitor 6 and provides an accurate representation of the error in the average current through the load 1. The second signal varies the level of the first signal with respect to the switching thresholds so as to minimise the error signal generated by the differencing node 41 between the average load current and the desired load current determined by the voltage applied to the terminal 13. Thus, irrespective of variations in parameters such as the switching thresholds and DC offsets, propagation delays, input voltage at the terminal 17, and the like, the second circuit ensures that the average current through the load 1 remains at or close to the desired value.

The action of the integrator 42 is such that virtually no input error is required to drive its output to the required state. This is because the current monitor 36 and the current source 37 have very high output impedance. The integrator provides a dominant pole in the loop response and the frequency of this pole may be adjusted to match the overall response of the control loop to the requirements of the system.

In the buck mode, the error signal is used only to correct the output current generated by the fast control loop, which is generally fairly close to the desired value. The amount of correction does not therefore need to be large and the gain of the control loop does not need to be high. Also, as the correction signal remains largely proportional to the output current over the operating range, the required gain of the control loop does not change significantly during dimming. The means that the constraints for loop stability may also be satisfied over the operating range without the need to change the integrator time constant so that the integrator may be formed fully within the integrated circuit containing the controller 2.

Figure 10:
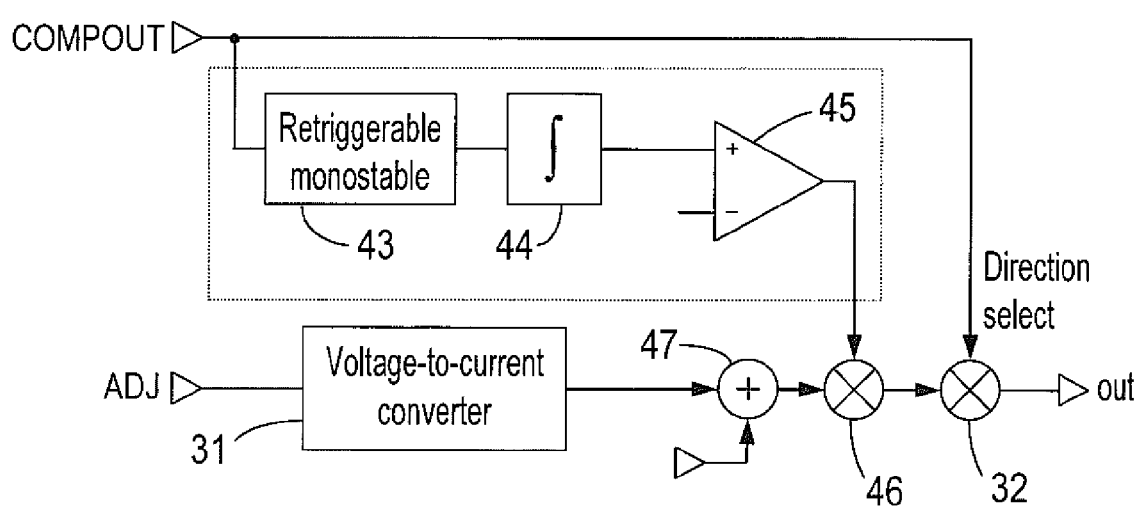
FIG. 10 illustrates another example of a hysteresis control of the regulator of FIG. 6.

When the regulator shown in FIG. 6 is used to supply power to the load 1 in the form of light emitters such as light emitting diodes, the light source may be dimmed by reducing the voltage on the input terminal 13. In addition to reducing the average current through the load 1, the hysteresis, which determines the ripple current, between the switching thresholds of the comparator 12 is also reduced linearly because it is arranged to be a fixed percentage, for example 30%, of the voltage at the input 13. The operating frequency of the switching regulator is inversely proportional to the inductance L of the inductor 3 and is inversely proportional to the amount of ripple, which is determined by the hysteresis of the comparator 12. In order to limit the extent to which the switching frequency is reduced, compensation may be provided within the hysteresis control 30 as shown in FIG. 10. The output of the comparator 12 is supplied to a frequency detector comprising a retriggerable monostable 43 and an integrator 44. The output of the integrator 44 is supplied to an amplifier 45 connected to one input of a multiplier 46. The multiplier 46 multiplies the output of the amplifier by the output of the converter 31. Thus, if the operating frequency is below a predetermined value, the frequency detector reduces the amount of current used for creating the hysteresis so as to maintain the switching frequency above a predetermined minimum value.

Figure 11A:
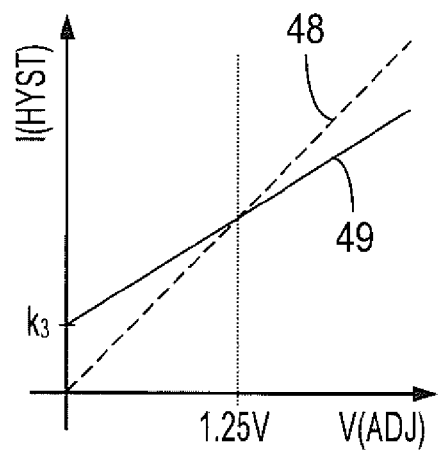
FIGS. 11a, b and c are graphs of output current, output current ripple and frequency of switching against adjusting voltage.
Figure 11B:
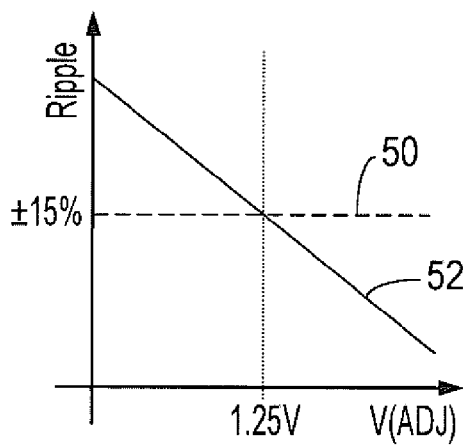
Figure 11C:
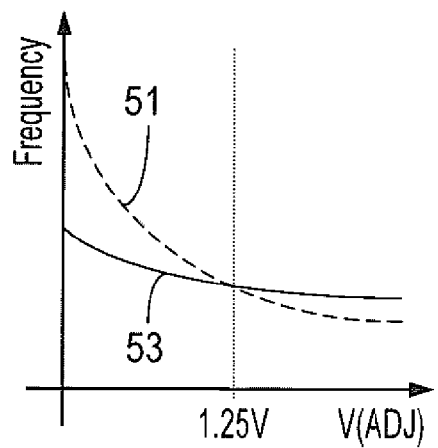

As previously mentioned, reducing the load current by applying a lower voltage to the input 13 tends to cause the switching frequency to increase. By adding a constant current and reducing the gain of the proportional current, the percentage hysteresis may be made larger as the voltage at the input 13 reduces so that the change in frequency becomes smaller. As shown in FIG. 10, a summing node 47 is provided between the output of the converter 31 and the multiplier 46. The summing node 47 receives a constant input value and the transconductance of the converter 31 is reduced as compared with that shown in FIG. 7. As shown in FIG. 11a, the transfer function between the output current of the hysteresis control in FIG. 7 and the adjustment voltage $V_{ADJ}$ at the input 13 is represented by the transconductance 48. By changing the gain and adding the constant term, the transconductance is represented by the line 49 in FIG. 11a. The percentage of ripple and the switching frequency for the hysteresis control of FIG. 7 are shown against the adjustment voltage by the curves 50 and 51 in FIGS. 11b and 11c, respectively, whereas the ripple and switching frequency for the reduced gain and constant term are shown by the curves 52 and 53, respectively.

Figure 12:
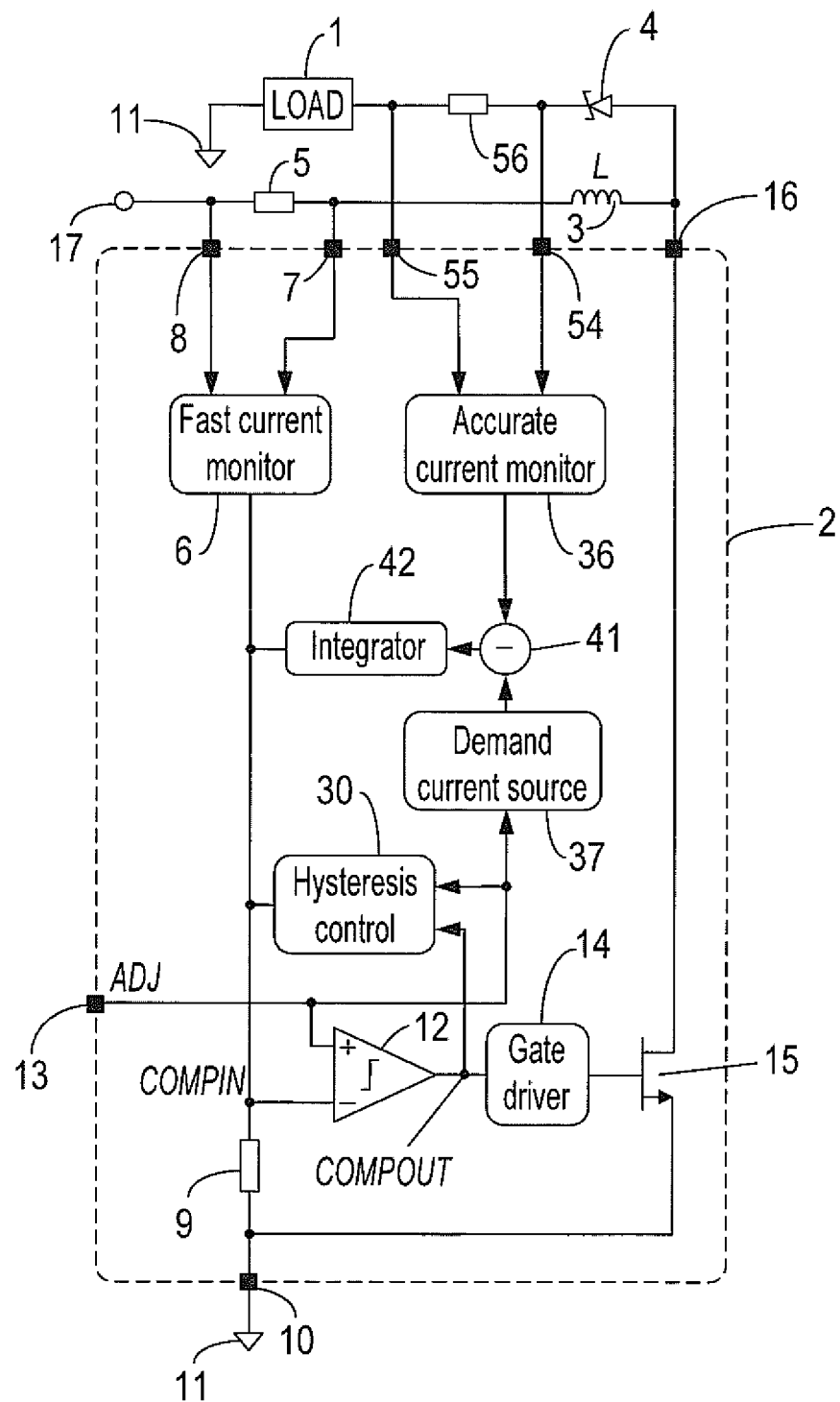
FIG. 12 is a block schematic diagram of a switching regulator and controller constituting a second embodiment of the invention.

FIG. 12 illustrates a switching regulator operating in the "boost" mode. The regulator makes use of a controller 2 which differs from that shown in FIG. 6 only in that the inputs of the accurate current monitor 36 are connected to input terminals 54 and 55 which are separate from the input terminals 7 and 8 connected to the inputs of the fast current monitor 6. For convenience, the controller 2 may be provided with the separate inputs 54 and 55 and then may be used in the buck mode as shown in FIG. 6 by connecting the inputs 54 and 55 to the inputs 7 and 8, respectively, externally of the integrated circuit forming the controller.

In order to operate in the boost mode, the inductor 3 is connected between the input terminal 7 and the output terminal 16 of the controller 2. The load 1 is connected in series with a second current-sensing resistor 56 and the diode 4 between ground 11 and the output terminal 16. The fast current monitor 6 therefore monitors the current passing through the inductor 3 whereas the accurate current monitor 36 monitors the current passing through the load 1. Operation of the controller is similar to that in the buck mode. However, because the average value of the load current is less than that through the transistor switch 15, the second circuit forming the control loop and comprising the current monitor 36, of the current source 37, the circuit node 41 and the integrator 42 is required to add a larger correction current at the output of the fast current monitor 6. The correction current comprises the normal error component plus the difference between the switch and load currents at the prevailing operating conditions.

Figure 13:
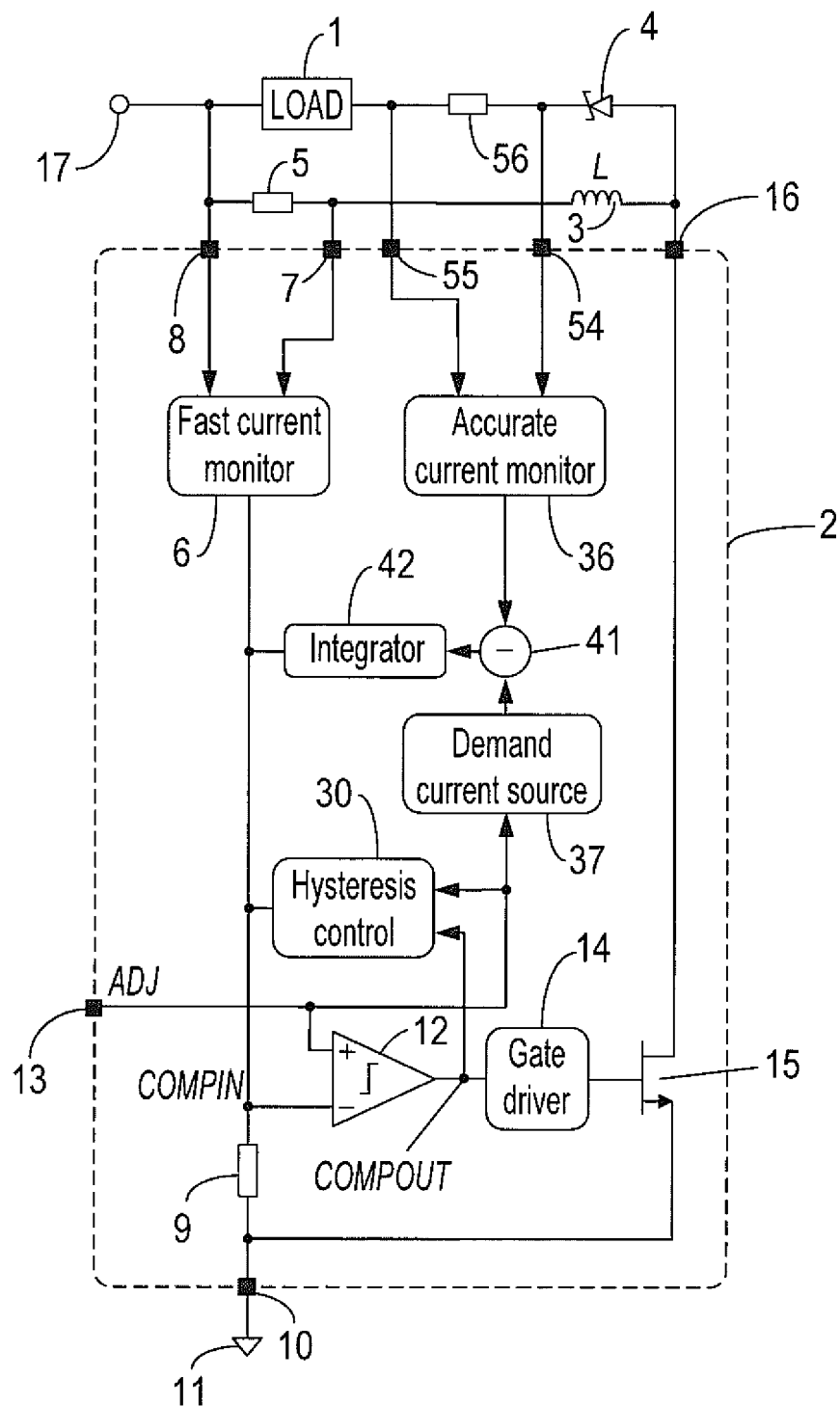
FIG. 13 is a block schematic diagram of a switching regulator and controller constituting a third embodiment of the invention.

FIG. 13 illustrates a regulator operating in the buck-boost mode. The controller 2 is identical to that shown in FIG. 12 and the only difference in the regulator circuit is that the load 1 is returned to the supply source terminal 17 instead of to ground.

Figure 14:
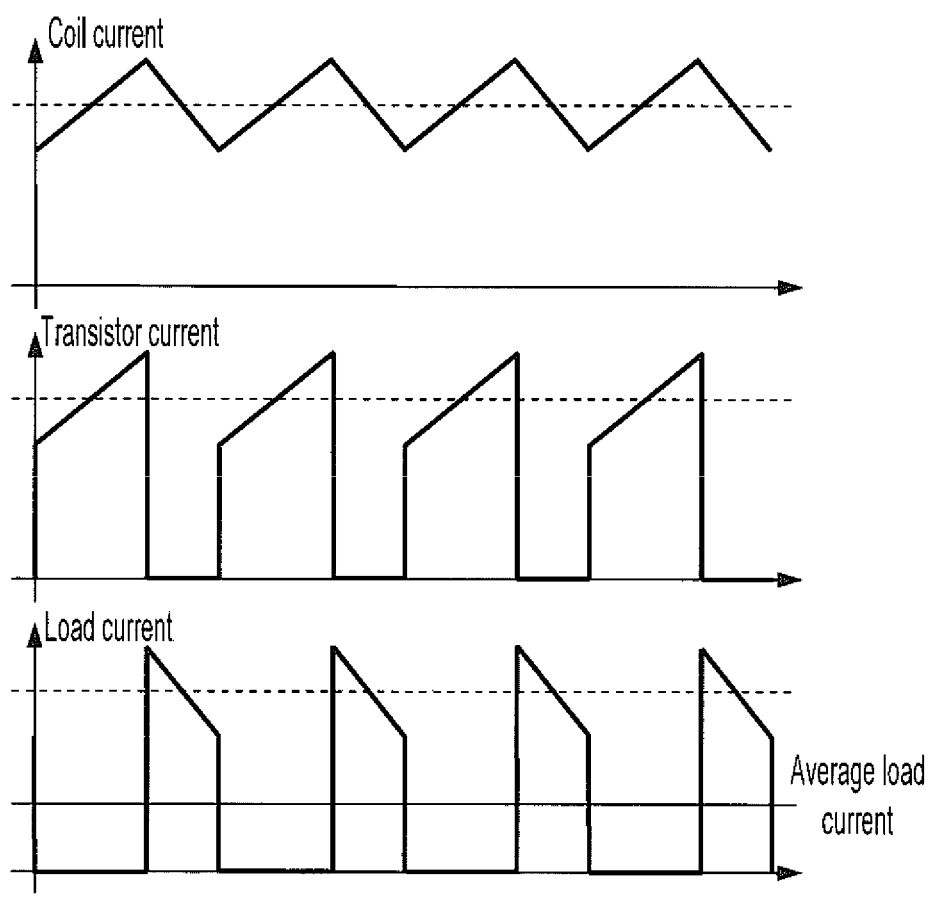
FIG. 14 is a waveform diagram illustrating coil current, transistor current and load current.

In the boost mode, the sensing resistor 56 experiences large changes in common-mode voltage during operation. The accurate current monitor must therefore be capable of responding accurately to the discontinuous nature of the load current by having good common-mode rejection at high frequency. The upper waveform of FIG. 14 illustrates the current passing through the inductor or coil 3 and the middle waveform illustrates the current passing through the transistor 15. The lower waveform illustrates the current passing through the load 1 and, in particular, illustrates the large common-mode component which is converted to the input voltage for the accurate current monitor 36 by the sensing resistor 56. Although it is possible to add a large capacitor in parallel with the load 1 so as to smooth the load current and reduce common-mode excursions, such a capacitor acts as a reservoir and, if pulse width modulation dimming is applied to the regulator, the dimming range is reduced.

Figure 15:
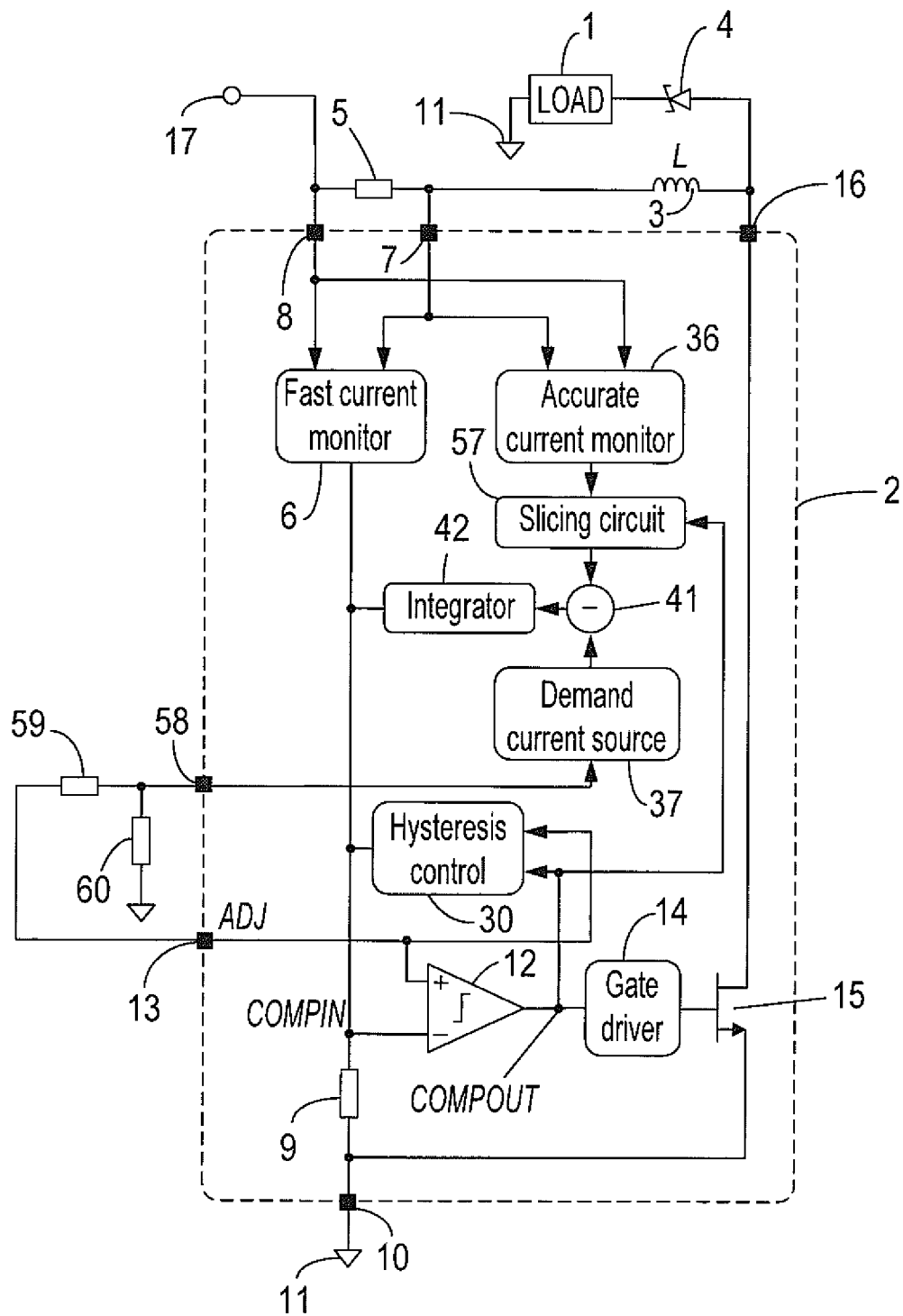
FIG. 15 is a block schematic diagram of a switching regulator and controller constituting a fourth embodiment of the invention.

In order to reduce this problem and remove the need for the sensing resistor 56, the regulator shown in FIG. 15 may be used. The inputs of the accurate current monitor 36 are again connected (within the integrated circuit or externally) to the inputs 7 and 8 and the sensing resistor 56 is removed so that the load 1 is connected in series with the diode 4 between the output terminal 16 and ground.

The current flowing through the resistor 5 and the inductor 3 either flows through the transistor 15 or through the diode 4 and the load 1. The path of this current flow is determined by the output of the comparator 12, which controls the switching of the transistor 15. The output of the comparator may therefore be used to control an arrangement for inferring the current in the load by monitoring the current in the resistor 5 when the transistor 15 is not conducting or switched off.

As shown in FIG. 15, a gate in the form of a slicing circuit 57 is provided between the accurate current monitor 36 and the circuit node 41. The slicing circuit 57 is controlled by the output of the comparator 12. In particular, when the comparator output is high so that the transistor 15 is switched on, the slicing circuit 57 effectively disconnects the output of the accurate monitor 36 from the circuit node 41 so as to ignore the current passing through the sense resistor 5, inductor 3 and transistor 15. When the output of the comparator is at a low level such that the transistor 15 is switched off, current flows through the inductor 3, the resistor 5, load 1 and diode 4. The slicing circuit 57 thus connects the output of the accurate current monitor 56 to the circuit node 41. The input to the accurate current monitor 36 corresponds to the upper waveform in FIG. 14 so that the accurate current monitor is not required to deal with large common-mode signals. The slicing circuit 57 ensures that the second circuit including the integrator 42 responds only to the current passing through the load.

The slicing circuit 57 may be formed by any suitable circuit, one example of which is a differential pair of transistors for steering the current from the accurate current monitor either to ground or to the circuit node 41 in accordance with the output state of the comparator 12.

The controller 2 shown in FIG. 15 differs from those described hereinbefore in that the input to the demand current source 37 is not connected to the input terminal 13 but instead is connected to its own input terminal 58. The average value of the load current from the regulator of FIG. 15 must be defined as a proportion of the average value of the current through the inductor 3. The current through the inductor 3 is "defined" by the value of the resistor 5 and the voltage at the input 13. If the output of the demand current source is reduced by a factor k, then the load current will be reduced by the same factor.

As shown in FIG. 15, this is achieved by providing a potential divider in the form of resistors 59 and 60 between the inputs 13 and 58. The voltage for controlling the regulator is supplied to the input 13 and is reduced by the attenuation factor k of the potential divider before being applied via the input 58 to the input of the demand current source 37.

The regulator of FIG. 15 operates in the boost mode. However, essentially the same configuration and, in particular, the same controller 2 may be used in the buck-boost mode. A suitable arrangement is shown in FIG. 16, in which the only difference from FIG. 15 is that the load 1 is returned to the supply input 17 rather than to ground 11.

Figure 16:
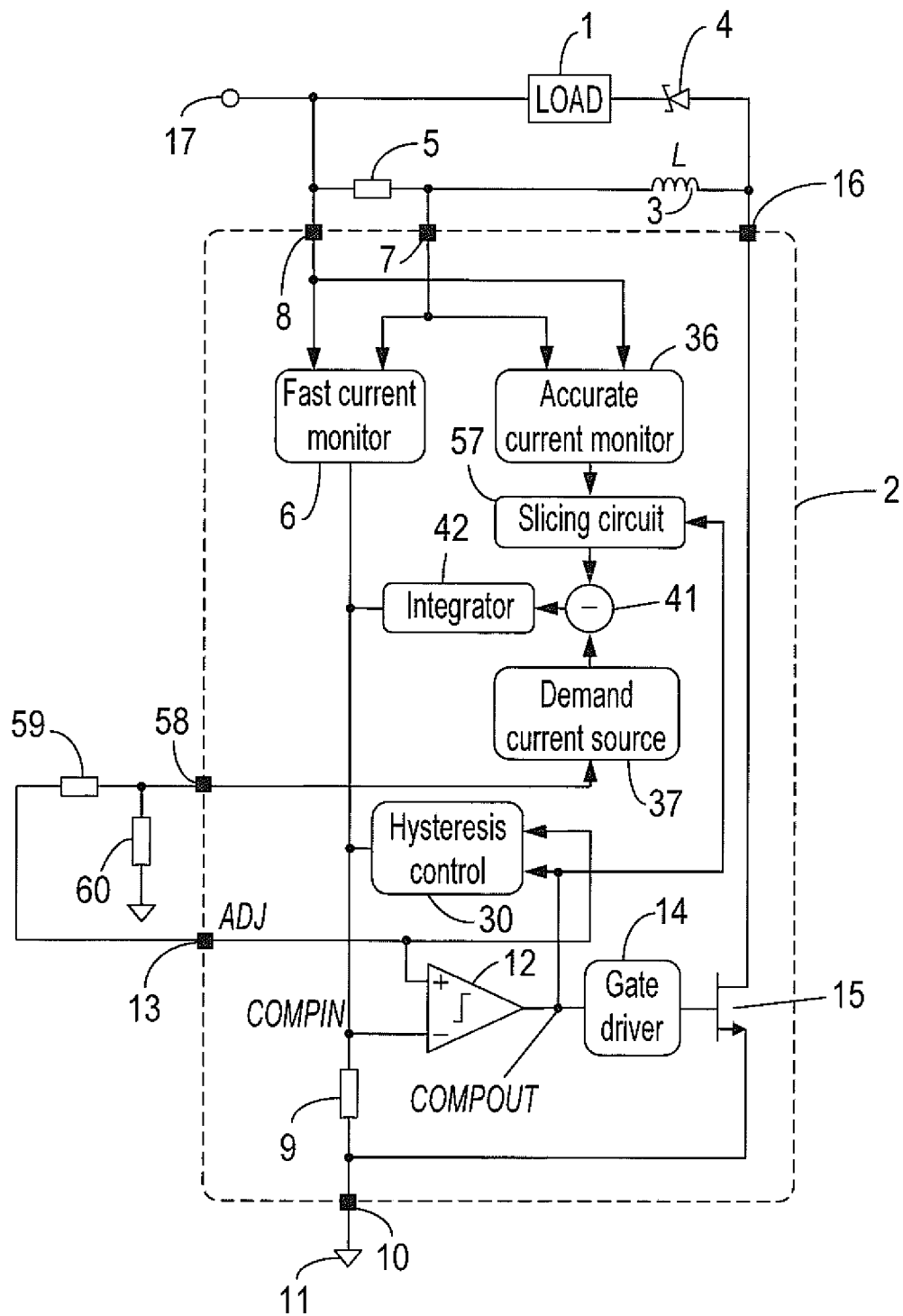
FIG. 16 is block schematic diagram of a switching regulator and controller constituting a fifth embodiment of the invention.
Figure 17:
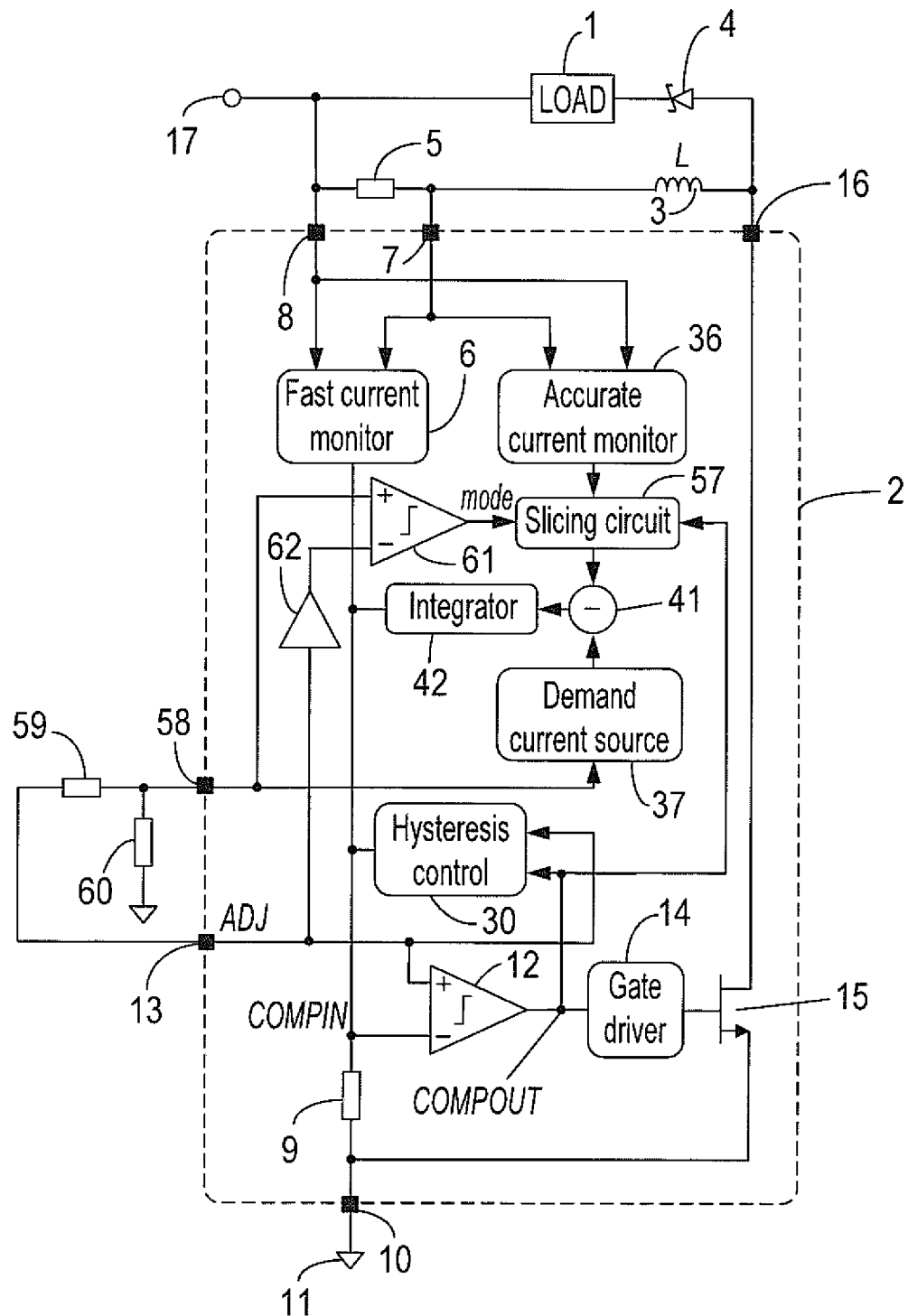
FIG. 17 is a block schematic diagram of a switching regulator and controller constituting a sixth embodiment of the invention.

FIG. 17 illustrates a converter of the type shown in FIG. 16 which allows the intended operating mode to be determined automatically and enables or disables the slicing circuit 57 accordingly. Enabling or disabling of the slicing circuit 57 is controlled by a comparator 61 having an inverting input connected to the output of an attenuator 62, whose input is connected to the terminal 13. The non-inverting input of the comparator 61 is connected to the terminal 58.

In the boost and buck-boost modes, the voltage at the terminal 58 is less than that at the terminal 13 in accordance with the attenuation provided by the potential divider comprising the resistors 59 and 60. The output of the comparator 61 is therefore low and this enables operation of the slicing circuit 57. When the controller 2 is used in a regulator in the buck mode, the input 58 is connected directly to the terminal 13 because the load 1 and the inductor 3 are in series and pass the same current. The output of the comparator 61 is high and this disables the slicing circuit 57 and connects the output of the accurate current monitor 36 to the circuit node 41. It is thus possible to provide a controller 2 which does not require a separate input terminal for determining its mode of operation.

What is claimed is:

1. A controller for a switching regulator, comprising:
    a hysteretic comparator (12, 30) for controlling a switch (15) for switching current into an inductor (3),
    a first circuit (6, 9) including a first voltage to current converter (6) for supplying a first signal representing instantaneous current in the inductor (3), when the switch is in an on state and when the switch is in an off state, to the comparator (12, 30),
    a second circuit (36, 37, 41, 42) including a second voltage to current converter (36) for supplying a second signal to the comparator, the second signal representing an error between a desired regulator output and a representation of an actual regulator output, and
    the comparator having a first input terminal arranged to receive the first signal and the second signal.

2. The controller according to claim 1 wherein the second signal is an averaged signal applied as a negative feedback signal modifying the first signal to the comparator (12, 30) whereby an averaged inductor current is controlled.

3. The controller as claimed in claim 1, characterized in that the second circuit (36, 37, 41, 42) has a slower response time than the first circuit (6).

4. The controller as claimed in claim 1, characterized in that the second circuit (36, 37, 41, 42) includes an integrator (42).

5. A controller as claimed in claim 4, characterized in that the integrator (42) is arranged to integrate the difference between the desired regulator output and the representation of the actual regulator output.

6. A controller as, claimed in claim 4, characterized in that the integrator (42) has a time constant of the order of several switching cycle periods during operation of the regulator.

7. A switching regulator characterized by comprising a controller as claimed in claim 1 and the inductor (3).

8. The regulator as claimed in claim 7 characterized by comprising a first sensing resistor (5) in series with the inductor (3) and connected to the first circuit (6).

9. The regulator as claimed in 8 characterized in that the first sensing resistor (5) is connected to the second circuit (36, 37, 41, 42).

10. The regulator as claimed in claim 8, characterized by comprising a second sensing resistor (56) in series with an output (1) of the regulator and connected to the second circuit (36, 37, 41, 42).

11. The regulator as claimed in claim 7 characterized in that an, or the, output (1) of the regulator is connected to the inductor (3) via a diode (4).

12. A light source characterized by comprising at least one light emitting device (1) connected to a regulator as claimed in claim 7.

13. A controller for a switching regulator, comprising:
    a hysteretic comparator (12, 30) for controlling a switch (15) for switching current into an inductor (3), the comparator (12, 30) having upper and lower thresholds;
    a first circuit (6, 9) for supplying a first signal, representing instantaneous current in the inductor (3), to the comparator (12, 30); and
    a second circuit (36, 37, 41, 42) for supplying a second signal to the comparator, representing an, error between a desired regulator output and an actual regulator output, characterized in that the first and second circuits (6, 36, 37, 41, 42) have first and second inputs, respectively, which are connectable or connected together and the second circuit (36, 37, 41, 42) includes a gate (57) arranged to pass a signal from the second input when the switch (15) is off and to block the signal from the second input when the switch (15) is on.

14. The controller as claimed in claim 13, characterized in that the gate (57) is arranged to be controlled by the comparator (12, 30).

* * * * *